(12) United States Patent
Kramer et al.

(10) Patent No.: US 11,826,851 B2
(45) Date of Patent: Nov. 28, 2023

(54) METHOD AND SYSTEM FOR LASER MACHINING OF RELATIVELY LARGE WORKPIECES

(71) Applicants: ACS Motion Control Ltd., Migdal HaEmek (IL); SCANLAB GmbH, Puchheim (DE)

(72) Inventors: Boaz Kramer, Afula (IL); Ze'ev Kirshenboim, Kiryat-Tivon (IL); Alexander Markus Dötlinger, Puchheim (DE)

(73) Assignees: ACS Motion Control Ltd., Migdal HaEmek (IL); SCANLAB GmbH, Puchheim (DE)

( * ) Notice: Subject to any disclaimer, the term of this patent is extended or adjusted under 35 U.S.C. 154(b) by 482 days.

(21) Appl. No.: 15/632,514

(22) Filed: Jun. 26, 2017

(65) Prior Publication Data

US 2018/0056443 A1 Mar. 1, 2018

Related U.S. Application Data

(60) Provisional application No. 62/476,907, filed on Mar. 27, 2017, provisional application No. 62/380,443, filed on Aug. 28, 2016.

(51) Int. Cl.
*B23K 26/082* (2014.01)
*G05B 19/402* (2006.01)
(Continued)

(52) U.S. Cl.
CPC ........ *B23K 26/082* (2015.10); *B23K 26/0604* (2013.01); *B23K 26/0853* (2013.01);
(Continued)

(58) Field of Classification Search
CPC ........... B23K 26/0821; B23K 26/0861; B23K 26/082; B23K 26/21; B23K 26/0604;
(Continued)

(56) References Cited

U.S. PATENT DOCUMENTS 4,532,402 A * 7/1985 Overbeck .......... B23K 26/0853
219/121.79
5,041,716 A * 8/1991 Wakabayashi ....... B23K 26/082
219/121.68
(Continued)

FOREIGN PATENT DOCUMENTS

CN 1213440 4/1999
CN 1125384 10/2003
(Continued)

OTHER PUBLICATIONS

International Search Report and the Written Opinion dated Oct. 12, 2017 From the International Searching Authority Re. Application No. PCT/IL2017/050709. (14 Pages).
(Continued)

*Primary Examiner* — Sang Y Paik
*Assistant Examiner* — Erwin J Wunderlich

(57) ABSTRACT

A laser machining device comprises a movable stage which is controlled by a stage controller. A laser produces a beam for machining and the beam is scanned over the part using a laser scanner under control of the laser scanner. The scanner controller controls the stage controller to synchronize movements of the stage with movements of the scanner. The stage may carry the part to be machined or the scanner.

12 Claims, 9 Drawing Sheets

(51) Int. Cl.
 *B23K 26/08* (2014.01)
 *G05B 19/19* (2006.01)
 *B23K 26/21* (2014.01)
 *B23K 26/06* (2014.01)

(52) U.S. Cl.
 CPC .............. *B23K 26/21* (2015.10); *G05B 19/19* (2013.01); *G05B 19/402* (2013.01); *G05B 2219/42219* (2013.01); *G05B 2219/45041* (2013.01)

(58) Field of Classification Search
 CPC .... B23K 26/0853; B23K 26/03; B23K 26/53; B23K 26/60; B23K 2103/172; B23K 2103/50; G05B 19/19; G05B 2219/45041; G05B 19/402; G05B 2219/42219; G02B 26/105; G02B 26/10; G02B 26/101; B28D 5/0005; A47B 2200/0056
 USPC .............. 219/121.8, 121.62, 121.79, 121.78, 219/121.81, 121.72, 121.67, 121.63, 219/121.85, 121.77, 121.69, 121.61, 219/121.74, 121.6, 121.68, 383, 121.65, 219/121.66, 121.73, 121.76, 21.82, 219/121.83
 See application file for complete search history.

(56) References Cited

U.S. PATENT DOCUMENTS

| | | | | |
|---|---|---|---|---|
| 5,191,187 A * | 3/1993 | Kajikawa | ............... | B23K 26/04 219/121.76 |
| 5,751,585 A * | 5/1998 | Cutler | .................. | H05K 3/0038 700/161 |
| 5,847,960 A * | 12/1998 | Cutler | .................... | B23K 26/08 700/187 |
| 6,706,999 B1 * | 3/2004 | Barrett | ................... | B23K 26/02 219/121.74 |
| 6,895,525 B1 * | 5/2005 | Wilkie | ..................... | H03L 7/16 713/500 |
| 6,922,420 B2 * | 7/2005 | Yamazaki | ................ | C21D 1/09 372/29.014 |
| 8,546,805 B2 * | 10/2013 | Shen | ....................... | G01N 21/55 257/57 |
| 8,871,540 B2 * | 10/2014 | Sato | .................. | B23K 26/0006 438/33 |
| 9,696,709 B2 * | 7/2017 | Haghighat | ........... | G05B 19/195 |
| 10,307,863 B2 * | 6/2019 | Di Cairano | ............ | B23K 26/04 |
| 2003/0093703 A1 | 5/2003 | Oliver et al. | | |
| 2007/0138146 A1 * | 6/2007 | Takami | ................ | B23K 26/066 219/121.6 |
| 2011/0210105 A1 * | 9/2011 | Romashko | ........... | B23K 26/042 219/121.72 |
| 2011/0240619 A1 | 10/2011 | Hayashi | | |
| 2012/0187103 A1 * | 7/2012 | Hayashi | ............... | B23K 26/082 219/383 |
| 2013/0026153 A1 * | 1/2013 | Ide | ...................... | C03C 23/0025 219/385 |
| 2021/0229216 A1 * | 7/2021 | Lucas | .................. | B23K 26/083 |

FOREIGN PATENT DOCUMENTS

| | | |
|---|---|---|
| CN | 1758984 | 4/2006 |
| CN | 102179631 | 4/2014 |
| WO | WO 97/34206 | 9/1997 |
| WO | WO 2015/158647 | 10/2015 |
| WO | WO 2018/042414 | 3/2018 |

OTHER PUBLICATIONS

International Preliminary Report on Patentability dated Mar. 14, 2019 From the International Bureau of WIPO Re. Application No. PCT/IL2017/050709. (8 Pages).
Notification of Office Action and Search Report dated May 28, 2020 From the State Intellectual Property Office of the People's Republic of China Re. Application No. 201780065657.8. (14 Pages).
Supplementary European Search Report and the European Search Opinion dated Mar. 25, 2020 From the European Patent Office Re. Application No. 17845657.0. (7 Pages).
Translation Dated Jun. 18, 2020 of Notification of Office Action dated May 28, 2020 From the China National Intellectual Property Administration Re. Application No. 201780065657.8. (12 Pages).
Notification of Office Action dated Apr. 8, 2021 From the State Intellectual Property Office of the People's Republic of China Re. Application No. 201780065657.8 and Its Translation of Office Action Into English. (29 Pages).
Communication Pursuant to Article 94(3) EPC dated Jun. 9, 2021 From the European Patent Office Re. Application No. 17845657.0. (4 Pages).
Notification of Office Action and Search Report dated May 28, 2020 From the China National Intellectual Property Administration Re. Application No. 201780065657.8 and Its Translation of Office Action Into English. (36 Pages).
Ground(s) of Reason of Rejection dated Jul. 8, 2021 From the Korean Intellectual Property Office Re. Application No. 2019-7006224 and Its Translation Into English. (9 Pages).

* cited by examiner

METHOD AND SYSTEM FOR LASER MACHINING OF RELATIVELY LARGE WORKPIECES

RELATED APPLICATIONS

This application claims the benefit of priority under 35 USC § 119(e) of U.S. Provisional Patent Application Nos. 62/476,907, filed on Mar. 27, 2017, and 62/380,443, filed on Aug. 28, 2016. The contents of the above applications are all incorporated by reference as if fully set forth herein in their entirety.

FIELD AND BACKGROUND OF THE INVENTION

The present invention, in some embodiments thereof, relates to laser machining using laser scanners and an XY stage and also to a bridge to synchronize and transfer data between two real time control systems.

A system and method of moving a laser beam along a desired path relative to a workpiece and delivering pulses of laser beam at uniformly spaced intervals and/or at pre-assigned locations along the desired path on the workpiece, where the system is comprised of two sub-systems, a cluster of one or more laser scanners that each steers a laser beam and fires the laser pulses and a motorized mechanical XY stage upon which the workpiece is placed. Each scanner can move the laser beam at a very high speed and acceleration but over a limited area due to the limited Field Of View (FOV) of the scanner, which is typically below 100 mm×100 mm. The XY stage can move the workpiece at low speed relative to the speed of the scanner but over areas that are much larger relative to the FOV of the scanner. By moving simultaneously both the laser beam (by the scanner) and the workpiece (by the XY stage) it is possible to move and fire each laser beam along areas that are much larger than the FOV of the laser scanner itself and to achieve high precision laser welding, marking, cutting and drilling of workpieces with area that are much larger than the FOV of the laser scanner, with higher throughput and without stitching errors when compared with a system in which the laser beam and the XY stage are not moving simultaneously. However, moving simultaneously both the laser beam (by the scanner) and the workpiece (by the XY stage), without compromising the accuracy of the positioning (or path) of the laser beam relative to the workpiece and firing of the laser along the desired path, requires to highly synchronize the closed loop control systems of the laser scanners and the XY stage and also to handle some accuracy limitations of the laser scanners and of the XY stage. To further increase throughput, a few laser scanners may be utilized with one mechanical stage.

The known art addresses the issues in a number of ways.

One known system uses a Laser scanner system for welding, marking, cutting and drilling (all referred to as "processing"), where the scanner controller steers the laser beam using motorized mirrors and fires the laser beam along the desired path. The scanner controller compensates for the distortion of the scanner optics by modifying the XY path command of the scanner with a correction table or other similar method. The speed of moving the laser beam is very high and it provides high throughput processing. Modern scanners are using digital control techniques with sampling and update rates of 100 kHz or higher due to the bandwidth of the scanner mirrors which is in the range of a few kHz. The working area is limited to the Field Of View (FOV) of the optics of the scanner.

In another known system, a motorized mechanical XY stage holds the workpiece in fixed manner and a stationary laser processes the workpiece. A motion controller of the XY stage moves the workpiece along a desired path under the laser beam and fires the laser beam along the desired path.

In such a system, the motion controller also compensates for inaccuracies of the stage as measured by feedback devices, such as optical encoders, by modifying the XY path command of the stage with a correction table or other similar method.

The speed of moving the workpiece is relatively low when compared to moving a laser beam with a scanner and results in low throughput processing. The most advanced digital motion controllers use update and sampling rates of about 20 kHz, which is sufficient for controlling mechanical tables that are actually limited in bandwidth to a few hundreds of Hertz and is typically below 200 Hz. The working area is not limited to the Field Of View (FOV) of the optics of the scanner and is defined by the size of the mechanical stage working area, and is practically unlimited in size.

It is also known to use a Laser scanner with its own controller mounted on top of a moving XY stage that in turn has its own motion controller to process non repetitive patterns over a large workpiece. The XY stage stands still and the scanner processes a part of the pattern that is within its FOV, following by deactivating the scanner and moving the XY stage to an adjacent area (tile) then standing and using the scanner to process another part of the pattern and so on.

The scanner controller compensates for the distortion of the scanner optics by modifying the XY path command of the scanner with a correction table or other similar method and the motion controller also compensates for inaccuracies of the stage as measured by feedback devices, such as optical encoders, by modifying the XY path command of the stage with a correction table or other similar method.

The throughput is negatively affected, relatively to a system with scanner only, by the repeated move and settle times of the XY stage during which the Laser is deactivated, and the accuracy is limited by stitching errors. Stitching errors result from the misalignment of adjacent FOV tiles, which is mainly because of the lens nonlinearity which is especially present at the border of the FOV, as any overall scanner and servo inaccuracies can manifest at the border or seam of adjacent blocks. An additional known system uses a Laser scanner mounted on top of a moving XY stage and then a single controller simultaneously controls and moves the stage and the scanner and fires the laser along the desired path. See EP 0 815 499 B1 and U.S. Pat. No. 8,426,768 B2, the contents of which are hereby incorporated by reference in their entirety as if set forth herein. In this method, the desired path is decomposed into two components using a low pass filter. The low frequencies of the path are used as the path command to the XY stage and the high frequencies of the path are used as the path command to the laser scanner.

In U.S. Pat. No. 8,426,768 B2, it is further described that the laser is fired at positions that are based on the actual four position feedback devices—the two feedback devices of the XY stage and the two feedback devices of the mirrors in the scanner that steer the laser beam. Further, it describes that the position measured by the mirrors' feedback devices are mapped with a two-dimensional error correction function to avoid the pincushion effect, that is compensating for the distortion of the scanner optics.

In this case, the system provides high throughput and eliminates the stitching errors.

When one controller manages both the stage and the scanner it requires high processing power and correspondingly expensive controller to execute the tasks effectively. The scanner is a high bandwidth system (~5 kHz) and requires sampling rate of 100 kHz. That said, the control algorithm is complex and due to the high sampling rate of 100 kHz requires a powerful processor to manage it. The stage, on the other hand, is a relatively low bandwidth system (<200 Hz) and requires profile generation and sampling rate of ~10 kHz. That said, also here the control algorithm may be complex and requires using a powerful processor to manage it.

Thus an advantage of using one controller is that the two systems are automatically synchronized, however the disadvantage is that it uses a processor that is very expensive relative to the cost of two processors that can each do one of the system control tasks. In addition, when there is more than one scanner, the demands from a single controller are increasing significantly, making such a solution of using one controller for a system with multiple scanners practically non-realistic.

It is also known to use one or more Laser scanners mounted on top of a moving XY stage, where each scanner is controlled by its own dedicated scanner controller, and the XY stage is controlled by its own dedicated motion controller. This method enables each scanner to process patterns with areas that are larger than the FOV of the scanner. Each scanner controller is fed with a position path that may be much larger than the FOV of the scanner. The XY stage is moving in a raster scanning like motion. The position feedback encoders of the XY stage are fed into each scanner controller. Each scanner controller subtracts the position reading of the stage from the desired position path and uses it as the path command to the scanner.

In this case the system provides high throughput. The more scanners that are used on one XY stage, the higher the throughput. Stitching errors are minimized. The accuracy is limited by the fact that the path command of the scanner is based on the feedback reading of the stage which is always delayed relative to the command and is noisier and erroneous.

SUMMARY OF THE INVENTION

The present embodiments may simultaneously control and move laser beams using scanners, and move the workpiece using the XY stage. The scanner controller, or one of the scanner controllers (if there are two or more scanners) acts as the master and among others derives and synchronizes the path commands for the scanner as well as for the XY stage.

Thus a controller, typically that of the XY stage, in addition to generating its own position commands based on a path provided off-line by an external supervisor (mode 1) and following position commands provided by a supervisor in real time (mode 2) also follows position commands provided by a scanner controller (mode 3), and has an ability to switch between the above three modes.

Correspondingly, the scanner controller, generates the position path for the scanner and also for the stage, and executes the path and operates the laser along its path relative to the workpiece as needed.

Furthermore, the XY stage motion controller is synchronized to the scanner controller as described below.

In embodiments, there may be more than one scanner, as well as multiple laser beams, mounted above or combined with one XY stage. In such case one of the scanner controllers acts as the master and among others derives and synchronizes the path commands for the scanner as well as for the XY stage, and each other scanner subtracts the position command to the stage from its own desired position path and uses the result of the subtraction as the path command to the scanner it is controlling. Such a method may provide a high combination of accuracy and throughput when compared to the known methods. It may apply to cases where each laser beam needs to process the same or similar patterns on the workpiece. For example, to process a large piece of glass and to produce many small (relatively to the size of the glass) displays for mobile phones.

It is also noted that in one embodiment, the workpiece may be held still, and the scanners may be moved on a mechanical XY stage, but the same relative movement effect is achieved either way.

Embodiments may further relate to a bridging device or bridge, and a method of synchronizing and transferring of real time data between the controllers of two subsystems where one system (the scanner controller) utilizes one real time synchronous network such as SL2-100, and the other, the stage control system, utilizes another type of synchronous real-time network based, such as EtherCAT.

The embodiments may enhance the capabilities of existing laser scanners, which are characterized by a limited field of view (FOV) and therefore a limited work area, by enslaving a separate existing stage controller to the scanner, thus overcoming the limited FOV and work area limitation.

It is noted that developing a single system that can manage both subsystems makes sense, but would require a huge development effort estimated at some 20 to 50 man-years to cover all sizes of stages and power needs. Providing a method to make the two existing systems work together and give the level of performance needed may save a huge amount of effort and time. Furthermore, the present embodiments allow a user who is used to an existing scanner to utilize the familiar system without going through the learning curve of working with a completely different system.

The embodiments may provide a bridge that connects between a scanner controller utilizing a real time network such as SL2-100 to transfer data between the scanner controller and the scanner motor drivers, and the stage controller, where the stage controller is also network based, but utilizing a real time network, such as EtherCAT to transfer information between the motion controller and other components such as the motor drivers.

According to an aspect of some embodiments of the present invention there is provided a laser machining device comprising:
a stage controller for controlling movement of a stage;
a laser for producing a beam;
a laser scanner for scanning the beam over a part to be machined;
a stage for movably holding one of a part to be machined and the laser scanner, to provide relative motion between the part to be machined and the laser scanner; and
a scanner controller for controlling the scanner; wherein the scanner controller is configured to control the stage controller, thereby to synchronize movements of the stage with movements of the scanner.

In an embodiment, the scanner controller may separate a path command signal into high frequency components and low frequency components and may feed the low frequency components as a stage path command signal to the stage controller and the high frequency components as a scanner path command signal to the scanner.

In an embodiment, the scanner controller uses a first clock at a first clock rate and the stage controller uses a second clock at a second clock rate, the second clock rate being equal or lower than the first clock rate, the stage controller using a derivative of the first clock to provide the second clock.

In an embodiment, the scanner controller may apply correction to the scanner path command signal to the scanner and the stage controller is configured to apply correction to the stage path command signal to the stage controller.

The device may compare a first delay at the scanner and a second delay at the stage, and apply first and second fixed delays to the scanner path command signal and to the stage path command signal respectively to synchronize respective stage and laser beam movements.

An embodiment may comprise at least one further laser beam scanner and at least one further scanner controller. One of the laser beam scanner controllers may separate a path command signal into high frequency components and low frequency components and may feed the low frequency components as a path command signal to the stage controller and the high frequency components as a path command signal to the one of the laser beam scanners. The laser beam scanner may provide the low frequency components to each of the further scanner controllers, and each of the further scanner controllers may subtract the received low frequency components from respective path commands to generate high frequency components of the respective path commands for feeding as a path command signal to a respective laser beam scanner.

In an embodiment, the stage movably holds the workpiece.

In an embodiment, the stage movably holds the scanner.

According to a second aspect of the present invention there is provided a laser machining device comprising:
  a stage for movably holding a part to be machined;
  a stage controller for controlling movement of the stage;
  a laser for producing a beam;
  a laser scanner for scanning the beam over the part to be machined;
  a scanner controller for controlling the scanner; wherein the scanner controller uses a first clock at a first clock rate and the stage controller uses a second clock at a second clock rate, the second clock rate being different from the first clock rate, the stage controller being configured to use a derivative of the first clock to provide the second clock.

According to a third aspect of the present invention there is provided a laser machining device comprising:
  a stage for movably holding a part to be machined;
  a stage controller for controlling movement of the stage;
  a laser for producing a beam;
  a laser scanner for scanning the beam over the part to be machined;
  a scanner controller for controlling the scanner; wherein the laser scanner and the scanner controller are connected using a first frequency communication network, and the stage controller is connected using a second network with a second different frequency, the first network and the second network being connected by a bridge component, the bridge component configured to obtain a first frequency clock signal from the first network and to provide a frequency derivative of the first frequency clock signal to a master component of the second network, thereby to synchronize the first and second networks.

According to a fourth aspect of the present invention there is provided a laser machining device comprising:
  a stage for movably holding a part to be machined;
  a stage controller for controlling movement of the stage;
  a laser for producing a beam;
  a laser scanner for scanning the beam over the part to be machined;
  a scanner controller for controlling the scanner; wherein the device is configured to provide first and second derivations of a path command as control signals for the laser scanner and the stage respectively, and to compare a first delay at the scanner and a second delay at the stage, and to apply first and second fixed delays to the scanner control signal and to the stage control signal respectively to synchronize respective stage and laser beam movements.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
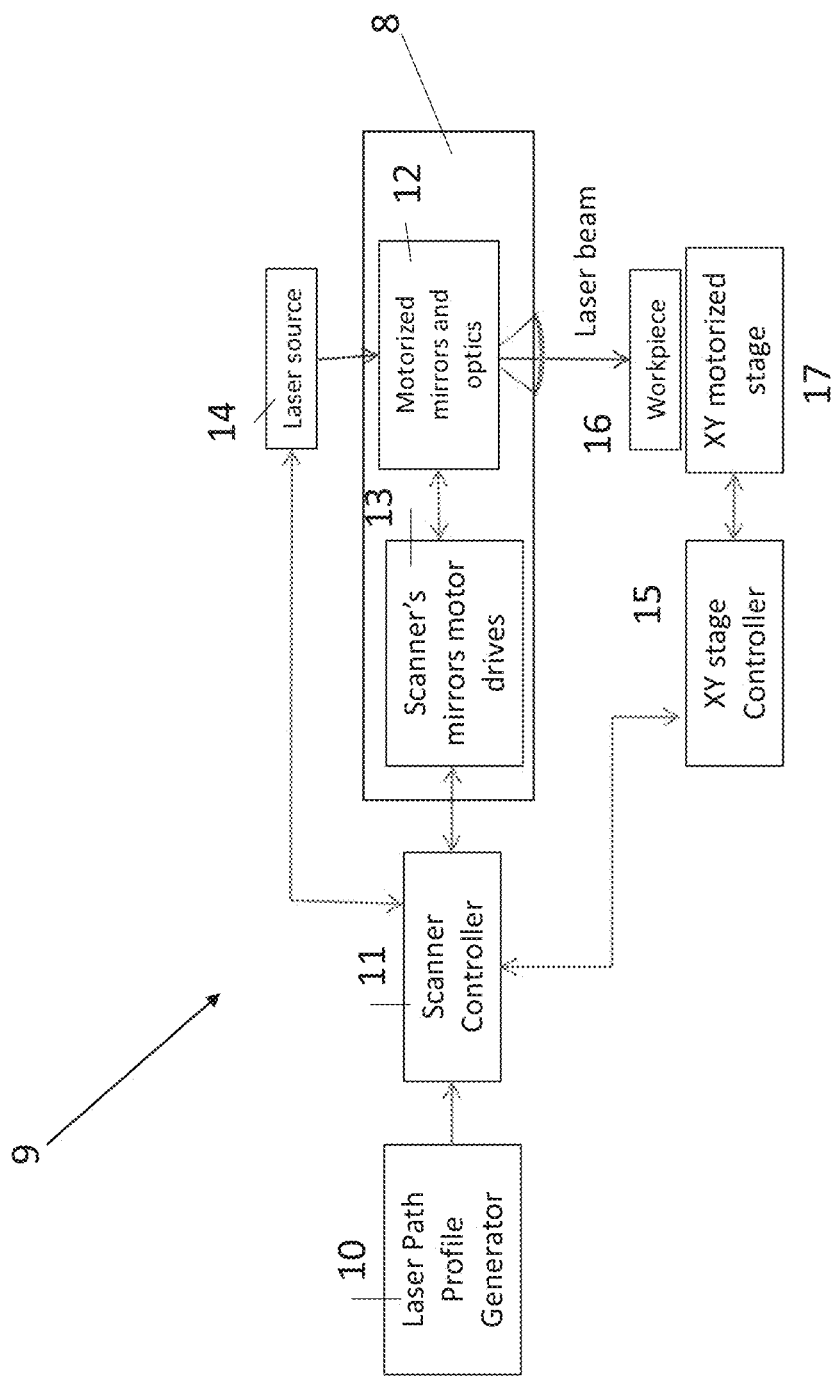
FIG. 1 is a simplified schematic block diagram showing a laser machining device according to a first embodiment of the present invention.

The present invention, in some embodiments thereof, relates to laser machining using laser scanners and an XY stage and also to a bridge to synchronize and transfer data between two real time control systems.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified schematic block diagram showing a laser system 9 for workpieces which is made up of an XY stage that holds the workpiece and a laser scanner. The XY stage carries the workpiece and has its own drive motor and its own controller. Alternatively, the workpiece may be stationary and the entire scanner attached on the XY stage so as to achieve the same relative motion between the Laser beam and the workpiece as in the arrangement where the workpiece is placed on the stage.

The case of systems that comprise one XY stage and multiple scanners will be discussed herein below.

The system consists of a laser path profile generator 10, typically implemented on a separate computer connected to the system. The generator may define the path of the laser relative to the workpiece needed to produce the desired pattern. A scanner controller 11 may control laser source 14 to operate the laser beam as required.

A laser scanner 8 is controlled by scanner controller 11 and may comprise motorized mirrors and optics 12 and mirror motor drives 13.

A motorized XY stage 17 carries the workpiece 16 to be processed by the laser beam. The motorized stage is moved and controlled by XY stage controller 15.

In operation, the profile generator 10 defines the path of the laser relative to the workpiece needed to produce the desired pattern, and then decomposes the path of the laser, to a path made of high frequencies, which can be assigned to the Scanner path, and low frequencies, to be assigned to the stage path. A low pass filter with constant or flat phase delay, and a FIR or high order Bessel filter may be used.

Then, the profile generator feeds the scanner controller 11 with the high frequency Scanner path and the low frequency Stage path. Alternatively it may feed it with the original, that is prior to decomposition, path of the laser and then the scanner controller may do the separation into high frequency Scanner path and low frequency stage path. The original path design and the decomposition are designed to ensure also that the scanner path stays within the image field of view of the scanner and that certain dynamic limitations, such as maximum velocity, acceleration and jerk of the XY stage are not exceeded.

The scanner controller 11 among others fires the laser or turns it on and off at uniform intervals or at pre-defined locations or at a pre-defined time along the desired original path, that is the path prior to decomposition. The scanner controller 11 may also correct the scanner path to compensate for the distortion of the optics and for scaling of the position and/or rotation command to the mirrors to cause the desired linear position of the laser beam, to provide a corrected Scanner path.

At a high update rate, for example at 100 kHz, scanner controller 11 may feed the mirror's drives 13 with the desired position of the mirrors per the corrected Scanner path, and at a lower update rate, for example using a 20 kHz clock that is derived from the 100 kHz clock of the high update rate, which may be derived from the clock that is used by the laser itself, and therefore fully synchronized to the high update rate, the scanner controller 11 feeds the XY stage controller with the desired position of the XY stage per the Stage path. The scanner controller may communicate with the XY stage motion controller over a serial bus or parallel bus, which serves as a Bridge. The bridge passes on position data and also the clock for the 20 kHz update rate. The Bridge itself may furthermore bridge between a scanner controller that utilizes a serial communication protocol, such as SL2-100 and the stage motion controller that uses a different communication protocol, such as EtherCAT (here the bridge is named SLEC).

The Scanner controller 11 may act as a master of both the scanner drives 13 as well as of the XY stage controller 15 and the laser 14, in the sense that (i) it is the only device that the external computer or user needs to pass the path information for the processing by the laser; (ii) it generates the desired position stream for both the scanner and the XY stage, and triggers and turns the laser on and off as needed.

In the above description, the workpiece is moved by the stage. However, what is significant is the relative movement, and in an embodiment the workpiece may be stationary and the scanner or scanners may be mounted on a movable stage. Such a stage can be a single or multi-axis, of any type, such as common X or XY stage, gantry table, belt-driven transportation system, robot arm or any other mechanism designed to move a scanner or a few scanners and a workpiece relative to one another.

Figure 2:
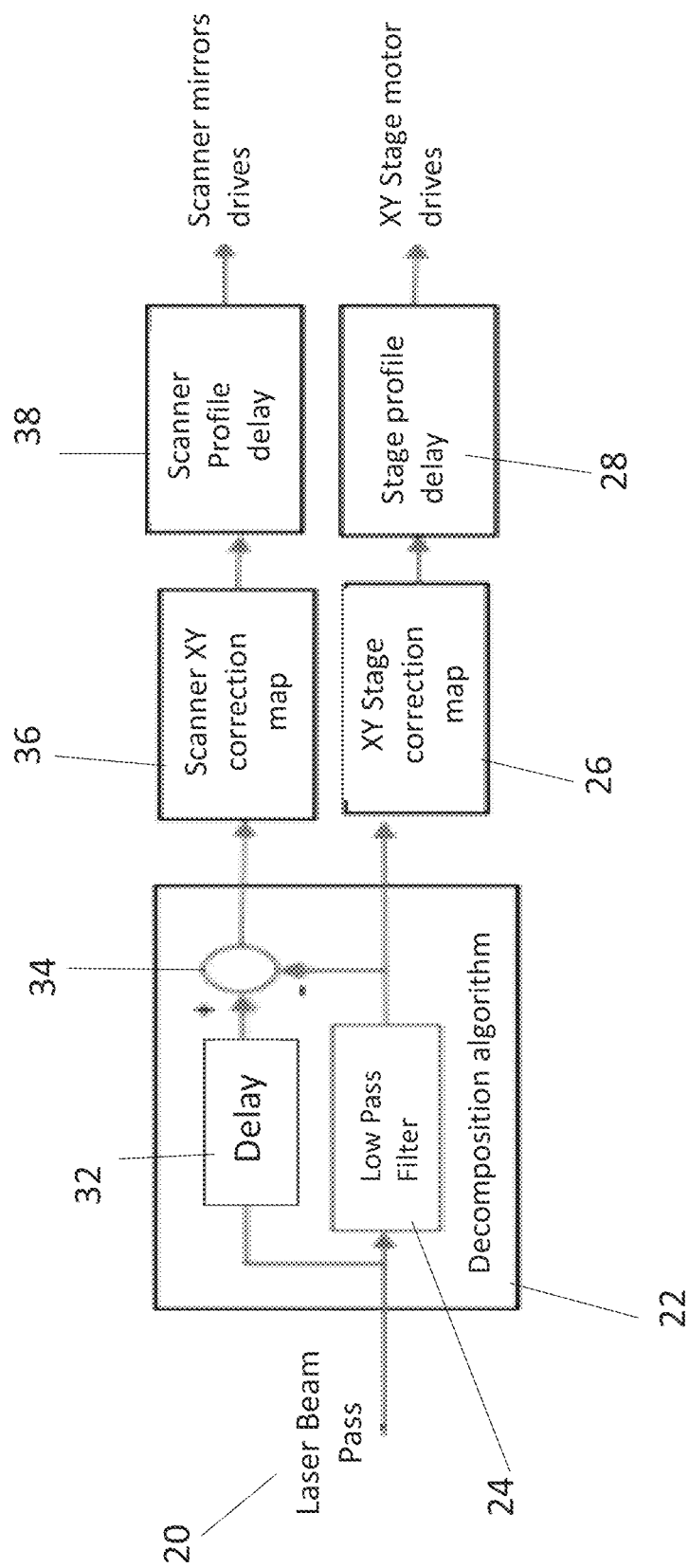
FIG. 2 is a simplified schematic block diagram of processing of the laser beam path command according to embodiments of the present invention.

Reference is now made to FIG. 2, which is a simplified block diagram showing how the laser beam path command is processed into two path command signals, one for the stage and one for the scanner. Laser beam path 20 as generated by the profile generator 10 is input to a decomposition block 22 which puts the path through a low pass filter 24 with constant or flat phase delay such as a FIR or high order Bessel filter. The direct output of the low pass filter, which comprises the low frequency components of the laser path is then provided to the XY stage correction map 26, to provide a corrected path as discussed above, from there through a stage profile delay 28 that is programmable to compensate for internal delays to ensure that the scanner profile and the stage profile are synchronized, and on to the XY stage motor drives.

The original path is also fed to delay 32 which sets the high frequency content of the path in phase with the low frequency content, and then the path is fed through a summer 34. At summer 34, the original path is applied to the positive input, and the output of the low pass filter to the negative input, to produce an output which contains the high frequencies. The high frequency output is provided to scanner XY correction map 36 to correct for the optics as explained above, then to scanner profile delay 38 that is programmable to compensate for internal delays to ensure that the scanner profile and the stage profile are synchronized and then to the scanner mirror drives to operate the mirrors of the laser scanner.

Figure 3:
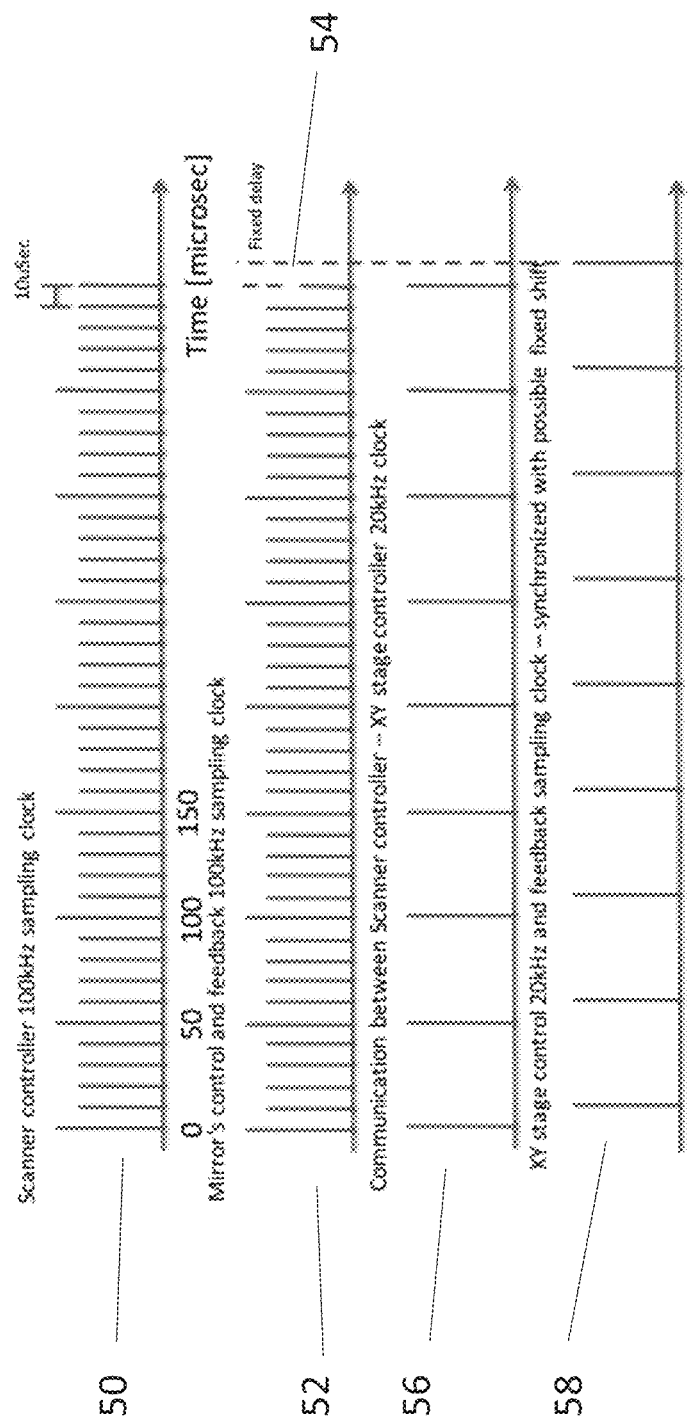
FIG. 3 is a simplified timing chart showing clocks and delays for the different components of a laser machining device according to embodiments of the present invention.

Reference is now made to FIG. 3, which illustrates the clock signals for various parts of the system. The scanner controller provides a 100 kHz sampling clock 50. The laser scanner control and feedback uses a clock 52 which is the same as the 100 kHz sampling clock 50. The communication between the scanner controller and the XY stage controller 56 uses a 20 kHz clock which is derived from the clock 50. The XY stage control and feedback uses 20 kHz clock 58 which is the same as the clock 56 but with small fixed delay 54 relative to clock 52.

Returning now to FIG. 1, and the scanner's mirrors motor drives 12 may use a closed loop control method with the same high sampling rate (using the same 100 kHz clock) to cause the mirrors to move as need to steer the laser beam along the desired corrected scanner path with as small as possible following error. The feedback encoders of the mirrors are sampled using the same 100 kHz clock, as discussed in respect of FIG. 3.

The XY stage controller 15 may correct the low frequency stage path to compensate for inaccuracies between the position as measured by the XY feedback devices and the actual position using an error mapping table 26 in FIG. 2, for example, resulting in a Corrected Stage path, and uses a closed loop control method using the same lower sampling rate (using the same 20 kHz clock) to move the workpiece mounted on the XY stage as need along the desired Corrected Stage path, with as small as possible following error. The feedback encoders of the XY stage are sampled using the same 20 kHz clock, as shown in FIG. 3.

The position commands, as derived from the corrected Scanner path and from the corrected XY stage path, may be used in a synchronized manner with a fixed, positive or negative, time shift, 54, and all the feedback devices, of the stage and of the mirrors, are sampled in a synchronous manner. Thus the XY stage feedbacks are sampled every 50 μsec using the 20 kHz clock, and the mirror feedbacks are sampled every 10 μsec. The path command to either the XY stage or to the scanner may be positively or negatively shifted in time to compensate for the fixed time shift between the motion of the laser beam by the scanner and the motion of the workpiece by the XY stage or between the two different control delays of the two systems. An empirical method may measure an actual time shift and accordingly set the necessary shift in time of the path command. As a result, the laser beam may follow the desired (original) XY path with an X error equal to the sum of the X stage error and X mirror error and with a Y error equal to the sum of the Y stage error and Y mirror error, and the laser pulsing interval may be applied with the same level of accuracy.

Figure 4:
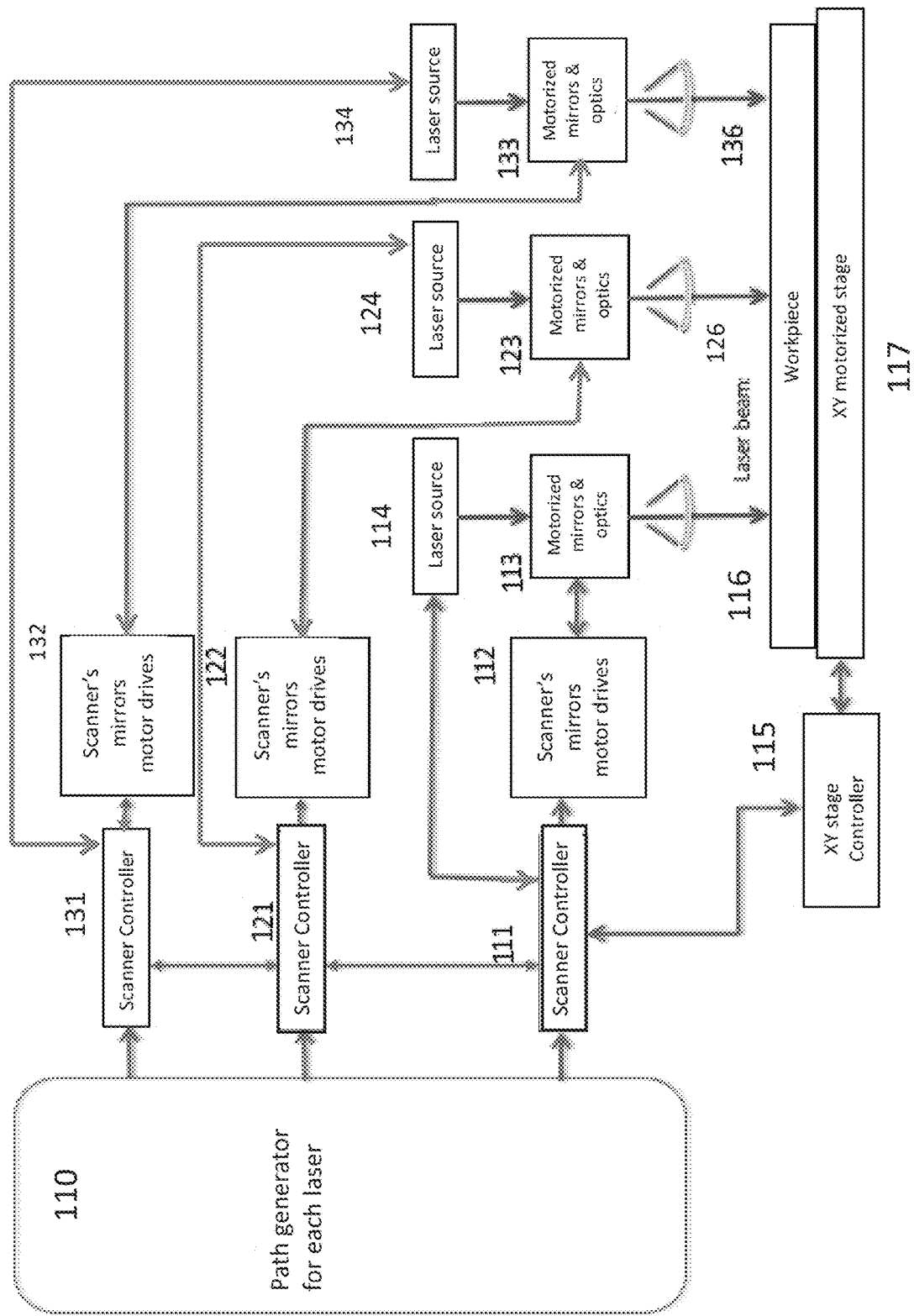
FIG. 4 is a simplified schematic block diagram showing an alternative laser machining device, using more than one scanner, according to embodiments of the present invention.

Reference is now made to FIG. 4 which illustrates a laser working system that uses one XY stage and multiple Laser scanners.

FIG. 4 in fact shows one XY stage and three laser scanners although it will be appreciated that this is purely exemplary.

The system consists of a computer that provides a path generator 110 for each laser which defines the path for each laser relative to the workpiece needed to produce the desired patterns. Three scanner controllers 111, 121 and 131 control the three laser source 114, 124 and 134. All the three scanner controllers are fully synchronized to one clock, for example to the 100 kHz clock of the first laser scanner.

Three scanners are each made up of motorized mirrors and optics 113, 123, 133, and mirror motor drives 112, 122, 132.

A motorized XY stage 117 is operated and controlled by an XY stage controller (including motor drives) 115, and the stage carries workpiece 116 for processing by the laser beams from the three laser sources 114, 124, and 134.

Figure 5:
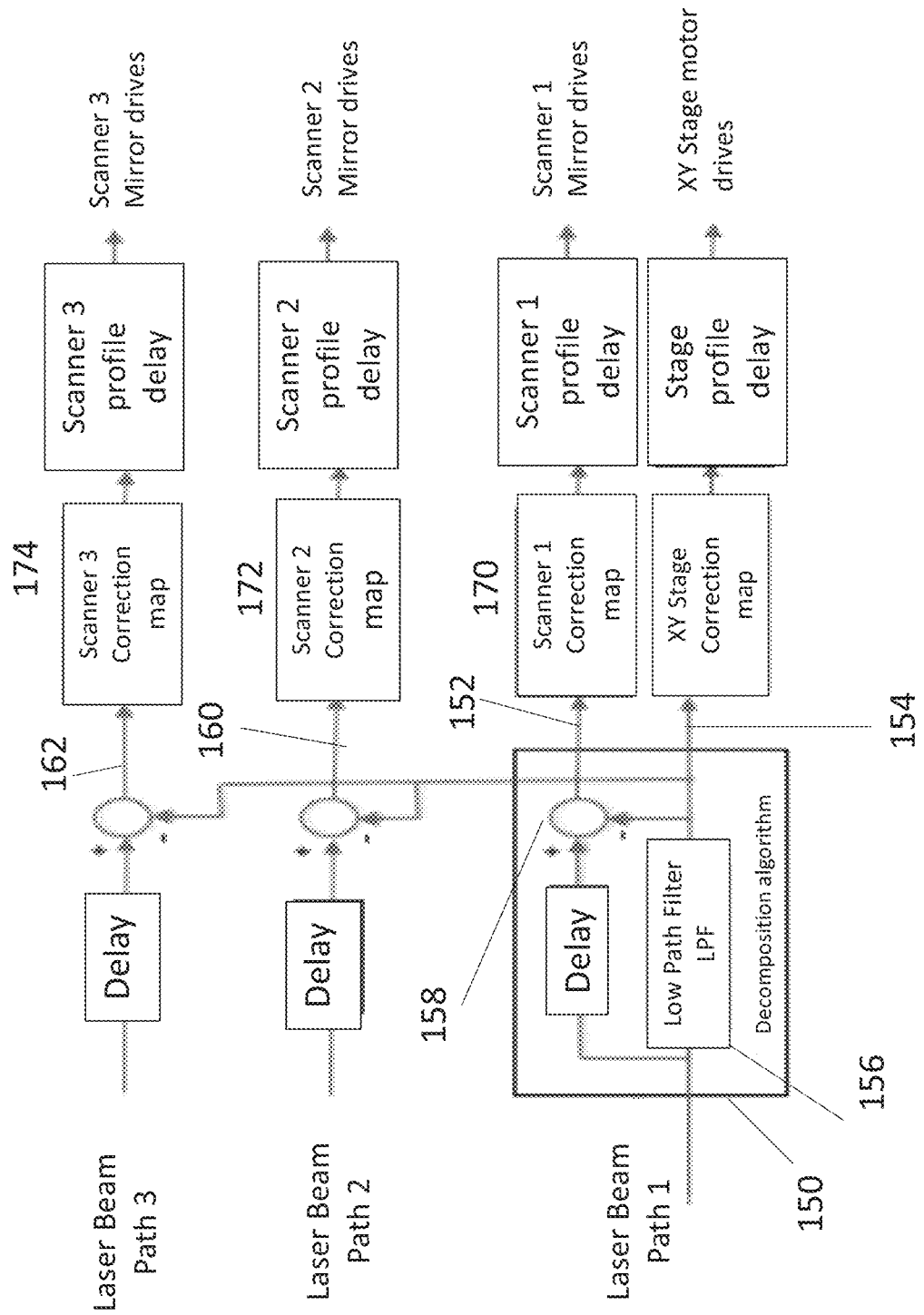
FIG. 5 is a simplified schematic block diagram showing processing of the laser beam path command according to the embodiment of FIG. 4.

Reference is now made to FIG. 5, which shows the operation of the system of FIG. 4. In use, the computer 110 initially defines the paths for each laser, relative to the workpiece, needed to produce the desired patterns, that is laser beam paths 1-3.

Decomposition unit 150 decomposes the path of just one of the laser paths, path 1, into a path made of high frequencies, the scanner path 152, and one path of low frequencies, the stage path 154, using a low pass filter 156 and a summer 158 as in FIG. 3.

At this point each scanner controller 111, 121 and 131 is fed with either the original path of the laser it controls as well as with the Scanner path 152, 160, 162 respectively, or just with the scanner path respectively, but only scanner controller 111 is fed also with the Stage path 154.

The Stage path 154 is then subtracted from laser beam path 2 that is delayed to set its high frequency content in phase with the stage path 154 and from laser beam path 3 that is delayed to set its high frequency content in phase with the stage path 154, for each of the two other lasers, and the results are fed as paths 160 and 162 respectively for each of the other two scanner controllers 121 and 131 (in FIG. 4). That is to say, the low frequency components, as identified at the first controller, are subtracted from each of the path commands following a delay, to give high frequency components of the paths that are synchronized with the path of the XY stage for control of each laser scanner.

Each scanner controller, 111, 121, 131, among others, fires its laser at uniform intervals or at random preset locations along the desired original path, prior to decomposing the respective path. The respective scanner controller may also correct the Scanner path in scanner correction maps 170, 172 and 174 to compensate for the distortion of the optics and may scale the position and/or rotation command to the mirrors to cause the desired linear position of the laser beam, thus to provide a corrected Scanner path. At a high update rate, for example 100 kHz, the respective scanner may feed the mirror drives 112, 122, 132, with the desired position of the mirrors per the corrected Scanner path. The first scanner controller 111 may feed the desired position of the XY stage per the Stage path 154. The first scanner controller 111 may communicate with the XY stage motion controller 115 over a serial bus or parallel bus (Bridge) with position data and may also include the clock of the 20 kHz and/or the 100 kHz.

As discussed with the single scanner embodiment, the bridge may connect between a scanner controller that utilizes a serial communication protocol, such as SL2-100 and a stage motion controller that uses a different communication protocol, such as EtherCAT (SLEC).

One scanner controller, the first scanner controller 111 in the example, may thus act as a master of the other scanner controllers as well as of the XY stage controller, in the sense that (i) it generates the desired position stream for both the scanner and the XY stage. (ii) The other two Scanner controllers 121 and 131 (in addition to the Stage controller) may be synchronized to the 100 kHz clock of the first Scanner controller 111.

Thus the embodiments of FIGS. 1 to 5 may provide a method of synchronizing the simultaneous motion of the workpiece through the XY stage and the laser beams through the one or more scanners by using one scanner controller as a master and decomposing the desired path of the laser beam relative to the workpiece into two parts, a low frequency path for the XY stage and a high frequency path for each scanner. Furthermore, the XY stage controller synchronizes its sampling and update rate to the sampling and update rate of the laser scanner controller that acts as a master, by using the clock of the communication channel through which the laser scanner controller transfers the desired XY stage path, which in turn is synchronized with the sampling and update rate of the laser scanner. Also, the other scanners are synchronized to the same clock of the master scanner controller.

Figure 6:
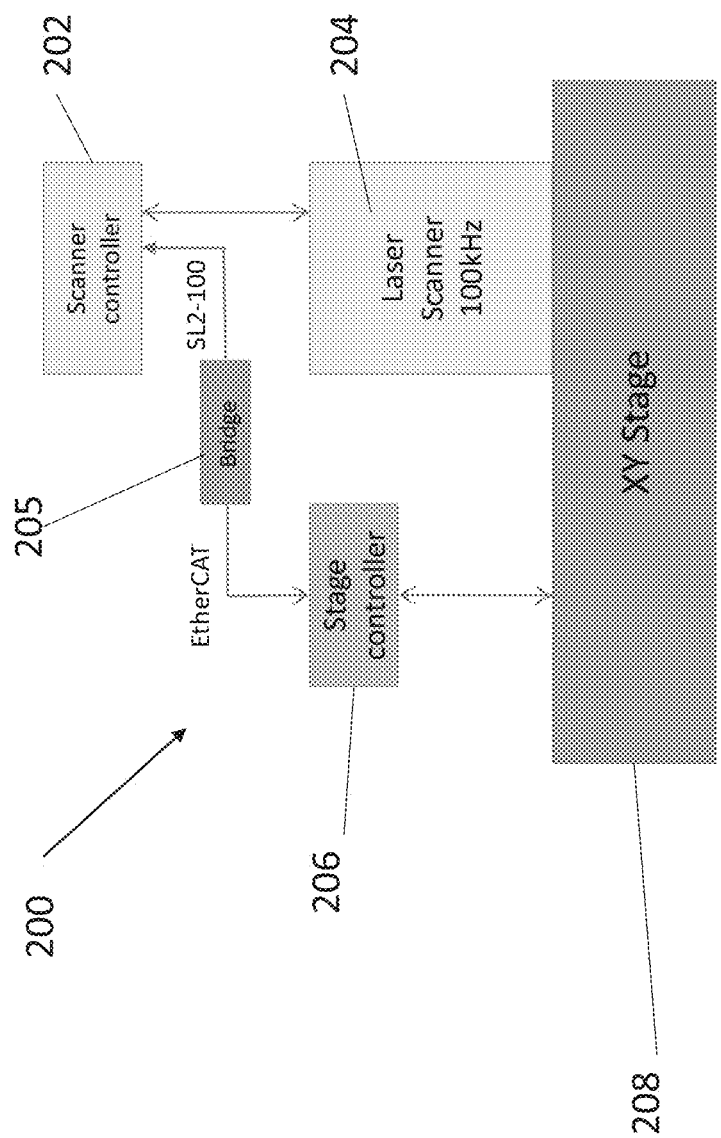
FIG. 6 is a simplified block diagram illustrating the use of different networks and a bridge component for connecting a device according to the present embodiments.

Reference is now made to FIG. 6 which is a block diagram showing a system 200 that uses a bridge. Master scanner controller 202 utilizes one type of network. For example a SL2-100 network, to communicate with its peripherals, such as a laser scanner 204 at 100 kHz. The stage controller utilizes a different type of network, an EtherCAT for example, to communicate with its peripherals at 20 kHz. A bridge 205 links between the scanner controller 202 and the stage controller 206, and may be used to transfer information between the scanner and the stage controller and may synchronize the two networks based on a derivation of the 100 kHz clock at the scanner controller. Stage controller 206 operates XY stage 208.

Each scanner controller, based on its desired path prior to decomposition of the path, fires the laser pulses at predefined intervals or at preset locations along the path, that is turning on and off the laser beam at required locations along the desired path on the workpiece.

Each scanner controller may then correct the desired path command of the scanner mirrors to compensate for the errors due to distortion by the optics, and the XY stage controller may correct the desired path of the workpiece due to inaccuracies of the feedback devices. As explained, an empirical method may be used to measure the fixed time shift between the control delay of each scanner and the control delay of the XY-stage.

The Bridge may be a dedicated node of a synchronous real time network, for example an EtherCAT node, and may synchronize the entire EtherCAT network (EtherCAT master and slaves) to the clock of the scanner controller 202, which may be derived to the clock of the laser and therefore synchronized with it. Thus all the drives and devices and the EtherCAT network become synchronized to the scanner controller clock and may also be synchronized to the laser clock, and the Laser Clock may act as master for the scanner controller, Such an arrangement may be useful for example when using ultra-short-pulse lasers.

The bi-directional communication bridge 205 may transfer a stage axis profile from the scanner controller to the EtherCAT master & motion controller and actual stage position information in the opposite direction.

The synchronization process may involve the bridge extracting the clock of the scanner from the signals and data provided according to the SL2-100 protocol. The entire EtherCAT network may then be synchronized to the extracted clock of the scanner. Usually, the entire network is synchronized to the clock of the first node in the EtherCAT network, using an EtherCAT standard feature named the "Distributed clock" method. Typically, this would be one of the motor drivers. In the present embodiments the stage controller, which is also the EtherCAT master, may be provided with the ability to modify the clock at the first node according to the clock information it gets from the Bridge and thus synchronize itself to the clock of the scanner. In this way the entire network is synchronized to the clock of the first node using the standard Distributed clock mechanism, which in turn is synchronized to the SL2-100 network.

Synchronization may guarantee that the motion of the stage axes is executed with a fixed and deterministic time shift (=positive or negative delay) vs. the motion of the scanner axes. The time shift may be measured and compensated for.

The Bridge 205 enables status & error bits with regards to the integrity of the motion of the scanner and the motion of the stage, and the bridge may also identify, generate and sends status and errors bits with regards to the integrity of communication between the two controllers. The resolution when driving the stage is larger than in the standard SL2-100 protocol (20 bit per axis). The present embodiments may take advantage of the lower sampling rate of the stage controller to use a high resolution block-wise transfer (at say 48 bits per axis).

Every communication cycle, each controller may toggle a bit that is transferred to the other controller via the bridge. The other controller may then monitor to ensure that the bit toggles each cycle. If the bit does not toggle, then it becomes apparent that the communication channel is impaired and can take necessary action, for example, turning the laser off or terminating the motion of the stage.

The present embodiments may thus provide a device—a bridge that links between two different devices, each utilizing a different real-time communication network. For example, between a laser scanner controller that utilizes a SL2-100 network and the stage controller that utilizes an EtherCAT network. On the scanner controller side, the bridge looks like a SL2-100 node, with one set of communication and sampling rates, and on the stage controller side it looks like an EtherCAT node with different communication and sampling rates.

Embodiments may provide a method to synchronize between the two synchronous networks. For example, the bridge 205 may extract the clock of the scanner 202 from the signals and data provided according to the SL2-100 protocol.

The stage controller 208, which is also the EtherCAT master, may modify the first node clock of the first EtherCAT network and synchronize it to the extracted clock of the scanner, at which point the entire network is synchronized to the first node clock and thus to the scanner 202 using the standard Distributed clock mechanism.

As explained, the two different systems, scanner & xy-stage, show different control delays. The control delay is defined as the time delay between the desired position and the resulting actual position as measured. To ensure that the actual position of the Laser beam relative to the work piece is the summation of the position of the XY-stage and the scaled XY position generated by the mirrors, the two systems may utilize the same clock and the difference between the two control delays of the two systems may then be compensated for. In order to determine the delay experimentally, and more precisely the difference between the two delays, the approach now described with reference to FIG. 7 may be used.

Figure 7:
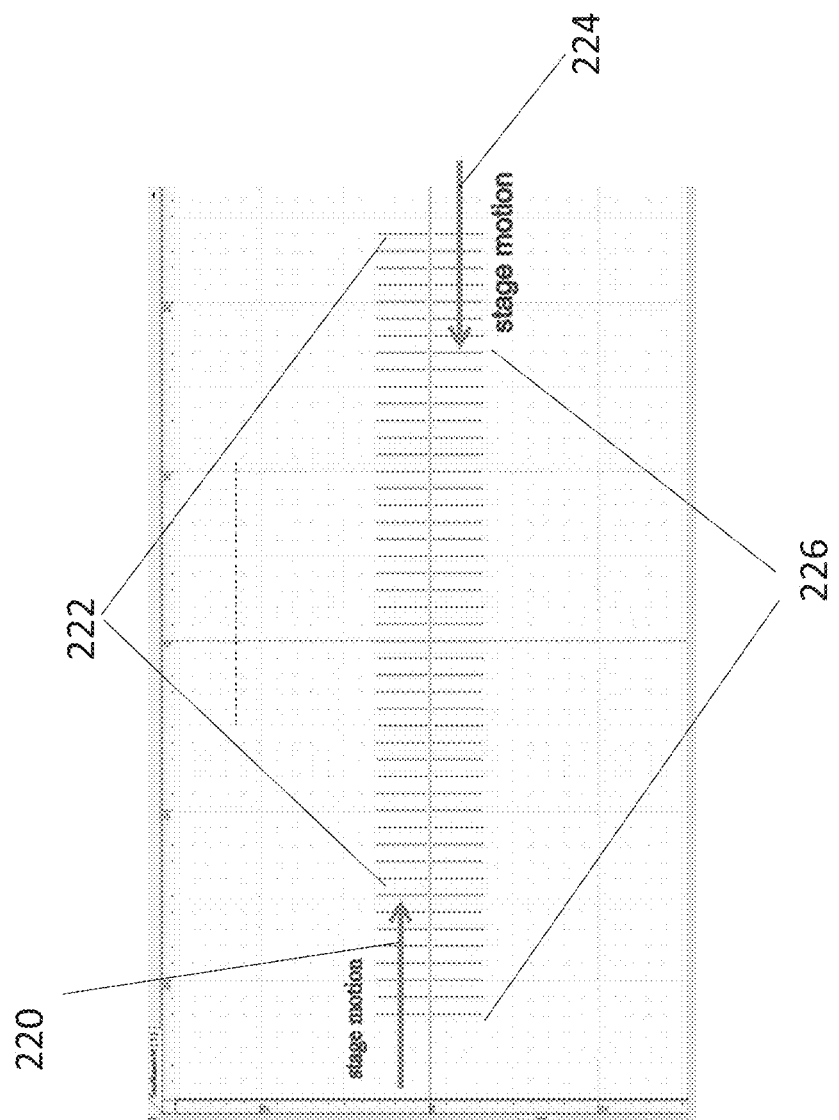
FIG. 7 is a simplified schematic diagram illustrating delay measurement and alignment of laser movement with stage motion.

FIG. 7 shows the basic principle that the xy-stage moves with a constant velocity (e.g. 0.4 m/s) from the left to the right, indicated by arrow 220, whereas the scanner marks lines 222 which are perpendicular to the stage motion. The same procedure is repeated from right to left as indicated by arrow 224, to mark lines 226. If the delay difference is compensated perfectly, the lines 222 and 226 produced using different directions of stage travel should be exactly aligned.

Figure 8:
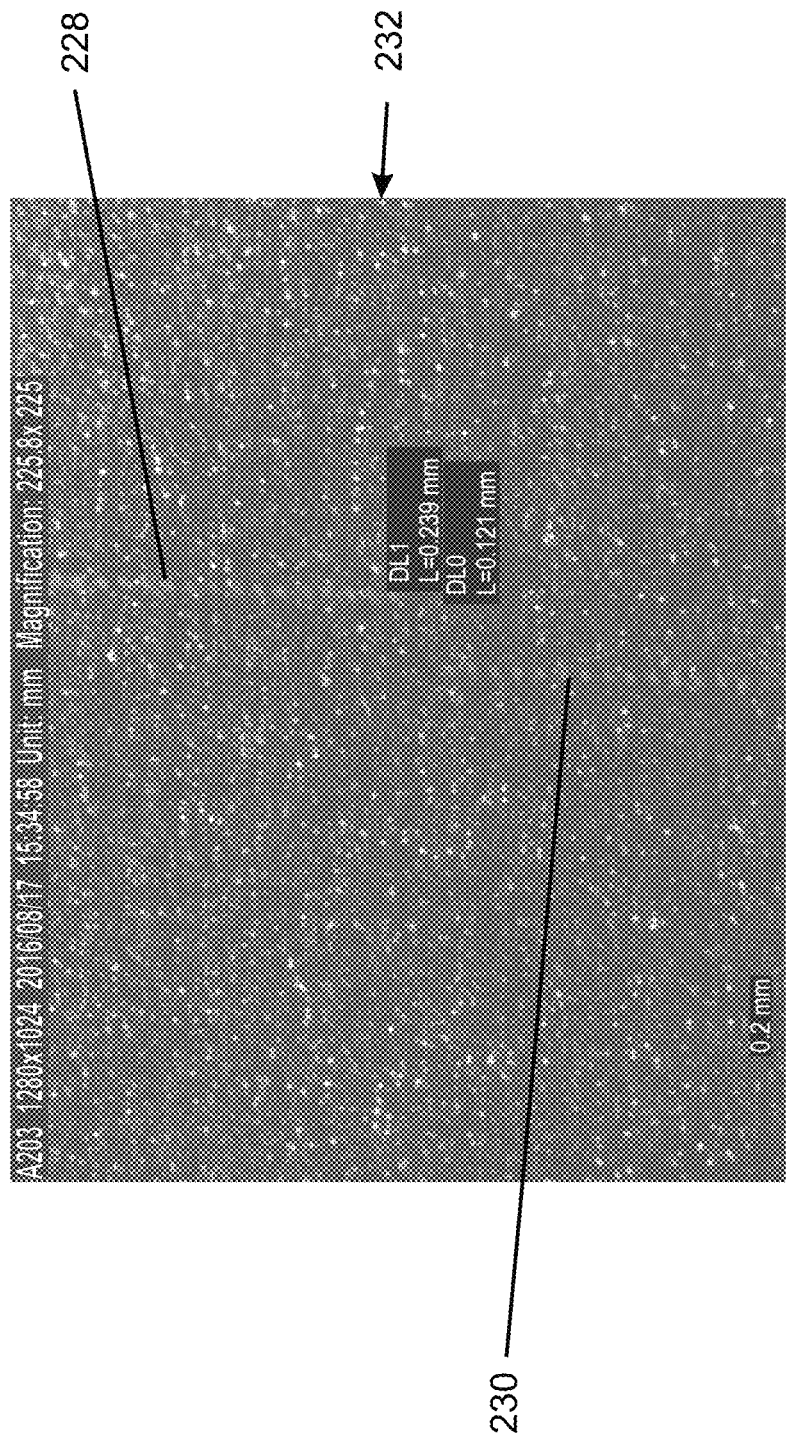
FIG. 8 is a photograph showing a machining surface prior to delay measurement, in which laser etching lines have not aligned.

FIG. 8 shows an experimental result in which lines 228 and 230 are etched onto a surface 232 of a workpiece. The stage speed is 0.4 m/s, and the measured distance (DL0) between the two lines is 121 µm, which indicates a delay difference of 121 µm/0.4 m/s ½=151 µs. The present embodiment may provide a straightforward way to measure the delay difference.

Figure 9:
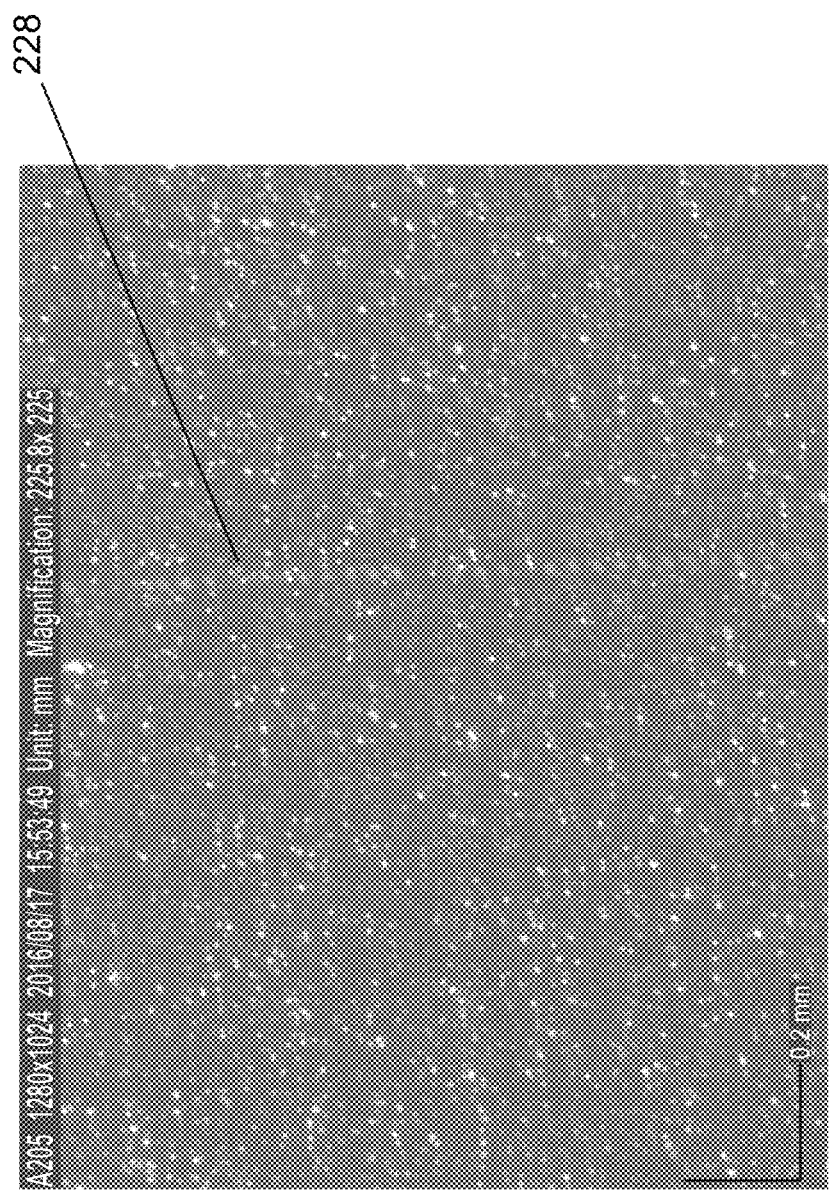
FIG. 9 is a photograph showing a machining surface after delay measurement and correction, in which laser etching lines are fully aligned.

FIG. 9 shows the result after delay compensation for the experimentally determined delay difference. The lines are aligned perfectly.

It is expected that during the life of a patent maturing from this application many relevant laser scanners, scanner controllers, XY stages and stage controllers will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A laser machining device comprising:
   a stage controller for controlling movement of a stage;
   a laser for producing a beam;
   a laser scanner for scanning said beam over a part to be machined;
   a stage for movably holding one of said part to be machined and said laser scanner, to provide relative motion between said part to be machined and said laser scanner; and
   a scanner controller for controlling motion of said scanner;
   a bus connecting said scanner controller to said stage controller; wherein said scanner controller is configured to control said stage controller over said bus, thereby to synchronize movements of said stage with movements of said laser scanner, the laser scanner operating at a relatively high bandwidth and the stage operating at a relatively low bandwidth, wherein said scanner controller uses a first clock at a first clock rate, said first clock providing a clock signal at said first clock rate, and said stage controller uses a second clock at a second clock rate, said second clock rate being lower than said first clock rate, said stage controller being configured to use a finite derivative of said first clock to provide said second clock, said stage and said scanner thereby being controlled for motion by different but related clocks, the scanner controller thereby acting as a master of the laser scanner as well as of the stage controller and the laser, the scanner controller further configured to separate a path command signal into high frequency components and low frequency components and to feed said low frequency components as a stage path command signal to said stage controller and said high frequency components as a scanner path command signal to said laser scanner, both said laser scanner and said stage comprising feedback devices, the feedback devices of said laser scanner and said stage configured to be sampled using their respective clocks, the respective clocks being synchronized with each other over said bus, the scanner controller configured to provide corrections to said scanner path command signal and said stage path command signal respectively, said scanner path command signal to the scanner and said stage path command signal to the stage being positively shifted in time or delayed with respect to said path command signal based on said provided corrections to compensate for a fixed time shift between a motion of said laser beam and a motion of said part or between two different control delays of said laser scanner and said stage respectively, thereby generating a desired position stream for both the laser scanner and the stage, and triggering and turning the laser on and off as required.

2. The laser machining device of claim 1, wherein said scanner controller is configured to apply a respective one of said corrections to said scanner path command signal to said scanner and said stage controller is configured to apply a respective other of said corrections to said stage path command signal to said stage controller.

3. The laser machining device of claim 1, configured to compare a first delay at said scanner and a second delay at said stage, and to apply first and second fixed delays to said scanner path command signal and to said stage path command signal respectively to synchronize respective stage and laser beam movements.

4. The laser machining device of claim 1, comprising at least one further laser beam scanner and at least one further scanner controller, wherein one of said laser beam scanner controllers is configured to separate a path command signal into high frequency components and low frequency components and to feed said low frequency components as a path command signal to said stage controller and said high frequency components as a path command signal to the said one of said laser beam scanners, said one laser beam scanner further configured to provide said low frequency components to each of said at least one further scanner controllers, and wherein each of said at least one further scanner controllers are configured to subtract said received low frequency components from respective path commands to generate high frequency components of said respective path commands for feeding as a path command signal to a respective laser beam scanner.

5. The laser machining device of claim 1, wherein said stage movably holds said part.

6. The laser machining device of claim 1, wherein said stage movably holds said scanner.

7. A laser machining device comprising:
an XY stage for movably holding a part to be machined;
a stage controller for controlling movement of said XY stage;
a laser for producing a beam;
a laser scanner for scanning said beam over said part to be machined;
a scanner controller for controlling motion of said scanner, the scanner controller being connected to said stage controller by a bus; said scanner controller comprising a first clock operating at a first clock rate, said first clock providing a clock signal at said first clock rate, said stage controller comprising a second clock operating at a second clock rate, said second clock rate being different from said first clock rate, said scanner and said XY stage thereby being controlled for motion by different clocks, said stage controller being connected to use a derivative of said first clock to provide said second clock, the scanner controller thereby acting as a master of the laser scanner as well as of the stage controller and the laser, the laser scanner operating at a relatively high bandwidth and the XY stage operating at a relatively low bandwidth, the scanner controller further configured to separate a path command signal into high frequency components and low frequency components and to feed said low frequency components as a stage path command signal to said stage controller and said high frequency components as a scanner path command signal to said laser scanner, the scanner controller being configured to shift a path command to either the XY stage or to the scanner either positively in time or delayed with respect to said path command signal to compensate for a fixed time shift between a motion of said laser beam and a motion of said workpiece or between two different control delays of said laser scanner and said XY stage respectively, thereby generating a desired position stream for both the laser scanner and the XY stage, and triggering and turning the laser on and off as required, both said laser scanner and said XY stage comprising feedback devices, the feedback devices of said laser scanner and said stage configured to be sampled by said respective first and second clocks in synchronous manner, and said compensating providing corrections to said scanner path command signal and said stage path command signal respectively.

8. The laser machining device of claim 7, wherein said scanner controller is configured to control said stage controller, thereby to synchronize movements of said XY stage with movements of said scanner.

9. The laser machining device of claim 8, wherein said scanner controller is configured to apply an optical correction to said path command signal to said scanner and a mechanical correction to said path signal to said stage controller.

10. The laser machining device of claim 8, wherein said scanner controller is configured to compare a first delay at said scanner and a second delay at said XY stage, and to apply a fixed time shift to said scanner path control signal and to said stage path control signal respectively to synchronize respective stage and laser beam movements.

11. The laser machining device of claim 8, comprising at least one further laser beam scanner and at least one further scanner controller, wherein one of said laser beam scanners controllers is configured to separate a path command signal into high frequency components and low frequency components and to feed said low frequency components as a path command signal to said stage controller and said high frequency components as a path command signal to said one of said laser beam scanners, said same one laser beam scanner further configured to provide said low frequency components to each of said at least one further scanner controllers, and wherein each of said at least one further scanner controllers are configured to subtract said received low frequency components from respective path commands to generate high frequency components of said respective path commands for feeding as a path command signal to a respective laser beam scanner.

12. A laser machining device comprising:
an XY stage for movably holding a part to be machined;
a stage controller for controlling movement of said XY stage;
a laser for producing a beam;
a laser scanner for scanning said beam over said part to be machined;
a scanner controller for controlling motion of said scanner; wherein said laser scanner and said scanner controller are connected using a first frequency communication network, and said stage controller is connected using a second network with a second different frequency, said first network and said second network being connected by a bridge component, said bridge component comprising one member of the group comprising a serial bus and a parallel bus, the bridge component configured to obtain a first frequency clock signal from said first network, said first frequency clock signal being a signal at said first frequency, and to provide a frequency derivative of said first frequency clock signal to a clock component of said second network, thereby to synchronize said first and second networks, said laser scanner and said XY stage thereby being operated at different clock speeds but synchronized based on said frequency derivative, the scanner controller thereby acting as a master of the laser scanner as well as of the stage controller and the laser, the laser scanner operating at a relatively high bandwidth and the XY stage operating at a relatively low bandwidth, the scanner controller further configured to separate a path command signal into high frequency components and low frequency components and to feed said low frequency components as a stage path command signal to said stage controller and said high frequency components as a scanner path command signal to said laser scanner, the scanner controller configured to shift said path command signal to either the XY stage or to the scanner positively in time with respect to said path command signal, or to delay said path command signal, to compensate for a fixed time shift between a motion of said laser beam and a motion of said part or between two different control delays of said laser scanner and said XY stage respectively, thereby generating a desired position stream for both the laser scanner and the XY stage, and triggering and turning the laser on and off as required, both said laser scanner and said XY stage comprising feedback devices, the feedback devices of said laser scanner and said XY stage sampled in synchronous manner to provide corrections to said scanner path command signal and said stage path command signal respectively.

\* \* \* \* \*